United States Patent [19]

Fujiwara et al.

[11] 4,287,790
[45] Sep. 8, 1981

[54] HIGH-SPEED BEVEL GEAR TRANSMISSION SYSTEM

[75] Inventors: Minoru Fujiwara; Tominori Yamada; Tstsuji Tamura, all of Tamano, Japan

[73] Assignee: Mitsui Engineering and Shipbuilding Co., Ltd., Tokyo, Japan

[21] Appl. No.: 94,877

[22] Filed: Nov. 16, 1979

[30] Foreign Application Priority Data

Oct. 11, 1979 [JP] Japan .................. 54-131143

[51] Int. Cl.³ .......................... F16H 37/06; F16H 1/22
[52] U.S. Cl. ............................ 74/665 GB; 74/417
[58] Field of Search ............ 74/417, 423, 665 F, 74/665 GB

[56] References Cited

U.S. PATENT DOCUMENTS

| 1,513,945 | 11/1924 | Vincent | 74/665 GB |
| 2,192,146 | 2/1940 | Nightenhelser et al. | 74/665 GB |
| 3,112,728 | 12/1963 | Krause | 74/665 GB |
| 3,478,620 | 11/1969 | Shimanckas | 74/417 |

Primary Examiner—C. J. Husar
Assistant Examiner—Conrad Berman
Attorney, Agent, or Firm—Armstrong, Nikaido, Marmelstein & Kubovcik

[57] ABSTRACT

A high-speed bevel gear transmission system for transmitting power from an input shaft to a pair of parallel outputs shafts the axes of which intersect each other. The input shaft has a pair of driving bevel gears which are fixedly mounted thereon such that the driving bevel gears face in opposite directions and which have the same number and size of teeth spirally arranged in the opposite directions each other. The output shafts are supported on angular contact ball bearings and have two driven bevel gears fixedly mounted thereon which are engaged with the driving bevel gears. The speed transmission ratio of the output shafts to the input shaft is 1.45:1 to 0.476:0.1, the relation between a pressure angle $\alpha$ and helix angle $\beta$ of the driving bevel gears and driven bevel gears, and a pitch cone angle $\delta$ of the driven bevel gears are defined by the formula, $R=[(\tan\alpha \cdot \sin \delta)/\cos \beta]-\tan\beta \cdot \cos \delta$ when $0.324 \leq R \leq 0.1$.

7 Claims, 3 Drawing Figures

HIGH-SPEED BEVEL GEAR TRANSMISSION SYSTEM

BACKGROUND OF THE INVENTION (1) Field of the Invention

The present invention relates to a high-speed bevel gear transmission system for transmitting power between input and output shafts the axes of which intersect each other.

(2) Description of the Prior Art

In order to transmit power between two shafts the axes of which intersect each other, a bevel gear transmission system can be generally used. The bevel gear transmission system, however, has two problems as follows in connection with its characteristics.

One of these problems is that the dimensions of producible bevel gears are considerably smaller than those of spur gears since the facility for manufacturing bevel gears is limited in scale. Namely, the problem is that the dimensions of producible bevel gears are limited. This means that the magnitude of power which can be transmitted by bevel gears is also limited. In other words, it cannot be expected to obtain bevel gears which permit the transmission of a large degree of power.

The other problem is that a bevel gear transmission system produces a large thrust load in the axial direction. In general, thrust bearings for supporting a thrust load, which have a large load capacity, are only permitted a low rate of revolution, and on the other hand, thrust bearings used for the same purpose, which have a large allowable rate of revolution, are small in load capacity.

Accordingly, it is desirable to use angular contact ball bearings having a large allowable rate of revolution for transmitting power at high speed. However, the life of ball bearings of this type is limited due to their small load capacity. It is, in fact, a very difficult technical problem to transmit power at high speed (effect the transmission of a high horsepower) with a bevel gear transmission system of this kind while maintaining a long life.

SUMMARY OF THE INVENTION

An object of the present invention is to provide an excellent bevel gear transmission system for use in transmitting a high horsepower at high speed.

Another object of the present invention is to provide a bevel gear transmission system having comparatively small bevel gears which permit transmitting a large power.

Still another object of the present invention is to provide a bevel gear transmission system in which a thrust load in the axial direction is reduced to zero or to an extremely low level.

A further object of the present invention is to provide a bevel gear transmission system in which angular contact ball bearings having a small load capacity and a large allowable revolution can be employed as thrust bearings for supporting a thrust load, and in which a horsepower to be transmitted can be increased by increasing the rate of revolution even when a torque to be transmitted is the same.

To this end, the present invention provides a high-speed bevel gear transmission system for transmitting power between input and output shafts the axes of which intersect each other. The transmission comprises an input shaft mounted on axially slidable bearings, a pair of driving bevel gears which are fixedly mounted on the input shaft such that the bevel gears face in opposite directions, a pair of driven bevel gears engaged with the driving bevel gears, respectively, and a pair of output shafts on which the driven bevel gears are fixedly mounted. The teeth of the driving bevel gears are the same in number and size and are spirally arranged in opposite directions to each other. Angular contact ball bearings are utilized for supporting the output shafts. The speed transmission ratio of the output shafts to the input shaft is 1.45:1 to 0.476:1. The relation between the pressure angle $\alpha$ and helix angle $\beta$ of the driving bevel gears and driven bevel gears, and the pitch cone angle $\delta$ of the driven bevel gears is defined by the formula, $$R = [(\tan\alpha \cdot \sin\delta)/\cos\beta] - \tan\beta \cdot \cos\delta$$

and $-0.324 \leq R \leq 0.1$.

The above other objects as well as advantageous features of the invention will become clear from the following description of preferred embodiments when taken in conjunction with the accompanying drawings.

DESCRIPTION OF PREFERRED EMBODIMENTS

Figure 1:
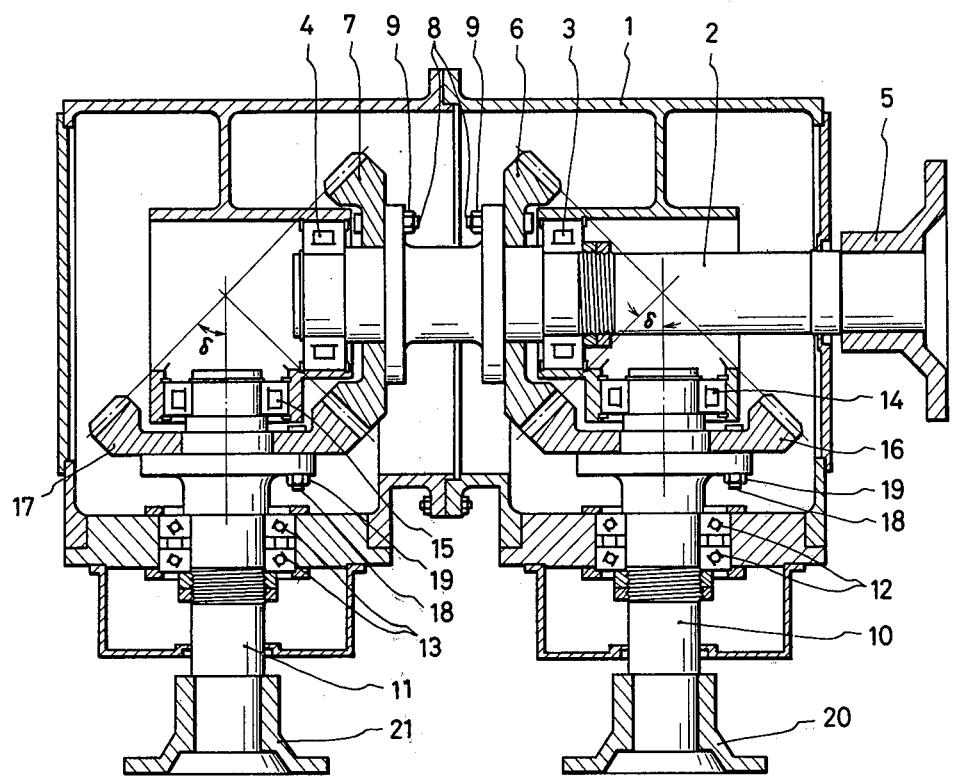
FIG. 1 is a longitudinal sectional view of a bevel gear transmission system embodying the present invention.

Referring to FIG. 1, reference numeral 1 denotes a gear box, and 2 an input shaft supported in the gear box 1 via cylindrical roller bearings 3, 4. These bearings 3, 4 are slidable in the axial direction so that the input shaft 2 supported thereon can be slightly moved in the axial direction with respect to the gear box 1. A coupling 5 is fitted around one end portion of the input shaft 2, which is connected to a driving source (not shown) via the coupling 5. Two bevel gears 6, 7 are fixedly mounted on the other end portion of the input shaft 2 with bolts 8 and nuts 9. Each of the bevel gears 6, 7 consists of a spiral bevel gear having a pressure angle $\alpha$ and a helix angle $\beta$. These bevel gears 6, 7 have the same number of teeth and the same pressure angle $\alpha$, helix angle $\beta$ and module m but the teeth thereof are spirally arranged in the opposite directions each other. The bevel gears 6, 7 are fixedly mounted on the input shaft 2 such that the gears 6, 7 face in opposite directions or such that the non-tooth-carrying surfaces thereof face each other as shown in FIG. 1.

A pair of parallel output shafts 10, 11 are fitted into the gear box 1 via angular contact ball bearings 12, 13, and cylindrical roller bearings 14, 15 such that the output shafts 10, 11 intersect the input shaft 2. Bevel gears 16, 17 are fixedly mounted with bolts 18 and nuts 19 on those portions of the output shafts 10, 11 which are between the angular contact ball bearings 12, 13 and cylindrical roller bearings 14, 15. The bevel gears 16, 17 are engaged with the bevel gears 6, 7, respectively, and each of the bevel gears 16, 17 consists of a spiral bevel gear the pressure angle $\alpha$ helix angle $\beta$ and module m of which are equal to those of the bevel gears 6, 7. The number of teeth of the bevel gears 16, 17 is arbitrarily determined in accordance with the speed transmission ratio thereof. Transmission shafts (not shown) are connected to the outer end portions of the output shafts 10, 11 via couplings 20, 21.

In the embodiment shown in FIG. 1, the bevel gears 6, 7 may be mounted on the input shaft 2 such that the tooth-carrying surfaces thereof face each other, though the non-tooth-carrying surfaces thereof face each other in FIG. 1. Namely, it is necessary that the bevel gears 6, 7 be disposed such that they face in opposite directions. It is not strictly necessary that the input shaft 2 and the output shafts 10, 11 intersect each other at right angles. The input shaft 2 and output shafts 10, 11 may be crossed at other angles as necessary. The driving bevel gears 6, 7 and the driven bevel gears 16, 17 engaged therewith, respectively, each of which consists of a spiral bevel gear, may be substituted by skew bevel gears having the same pressure angle $\alpha$ and spiral angle $\beta$.

When the input shaft 2 in the above-described bevel gear transmission system is driven by a driving source (not shown), a component of thrust load is applied in the axial direction to the bevel gears 6, 7 mounted thereon since the bevel gears 6, 7 are engaged with the bevel gears 16, 17 respectively. Since the spiral directions of the bevel gears 6, 16 and bevel gears 7, 17 are opposite to each other, and since the bevel gears 6, 7 face in opposite directions, a thrust load is applied axially in the opposite directions so that the thrust loads offset each other. Therefore, substantially no thrust load is applied to the input shaft 2. When a difference develops between the transmission powers in the two pairs of bevel gears, the input shaft 2 is axially moved to be stopped in a balancing position owing to the axially movable cylindrical bearings 3, 4.

According to the results of investigations among the inventors of the present invention, thrust loads applied to the output shafts 10, 11 can be completely eliminated or reduced to an extremely low level and also allowable horsepower to be transmitted can be made higher in angular contact ball bearings used in the output shafts 10, 11 than other bearings such as tapered roller bearings by setting the speed transmission ratio between the bevel gears 6, 7 and bevel gears 16, 17, i.e. the speed transmission ratio of the output shafts 10, 11 to the input shaft 2, to 1.45:1 to 0.476:1, and the factor R in the following equation from $-0.324$ to $0.1$.

$$R = \frac{\tan\alpha \cdot \sin\delta}{\cos\beta} - \tan\beta \cdot \cos\delta$$

wherein $\alpha$ is the pressure angle of teeth of the bevel gears 6, 7, 16 and 17; $\beta$ is the helix angle of teeth of the bevel gears 6, 7, 16 and 17; and $\delta$ is the pitch cone angle of the bevel gears 16 and 17.

The factor R represents a ratio of a thrust load in the axial direction of the bevel gears 16 and 17 to a tangential load of the bevel gears 16 and 17. In other words, when a thrust force of the bevel gears 16 and 17 denotes $W_{th}$ and a tangential force of the bevel gears 16 and 17 denotes $W_{tan}$, a ratio R of $W_{th}$ to $W_{tan}$ is represented as follows:

$$R = \frac{W_{th}}{W_{tan}} = \frac{1}{\cos\beta}(\tan\alpha \cdot \sin\delta - \sin\beta \cdot \cos\delta) = \frac{\tan\alpha \cdot \sin\delta}{\cos\beta} - \tan\beta \cdot \cos\delta$$

When the transmission ratio i is 1.45, the above ratio R becomes $-0.324$, and on the other hand, when the transmission ratio i is 0.476, the ratio R becomes 0.1. That is, in the range of the transmission ratio of from 1.45:1 to 0.476:1, the R ranges from $-0.324$ to $0.1$.

Explaining in details, further, since there is a relationship of $i = \cot\delta$ between the transmission ratio i and the pitch cone angle $\delta$ of the bevel gears, obtained are $\delta = \cot^{-1} 1.45 = 34.59°$ and $\delta = \cot^{-1} 1/2.1 = 64.54°$ respectively at $i = 1.45$ and $i = 0.476$.

Accordingly, when the pressure angle $\alpha$ is 20° and the helix angle $\beta$ is 35°, obtained respectively at $\delta = 34.59°$ and $\delta = 64.54°$ are $R = -0.324$ and $R = 0.1$.

As apparent from the definition of the factor R, R is unitless in measure.

Thrust loads axially applied to the output shafts 10, 11 can be reduced to an extremely small level by setting the speed transmission ratio and a factor R in the above-mentioned manner. As a result, the output shafts 10, 11 can sufficiently with-stand the loads applied thereto, with the angular contact ball bearings 12, 13 of a small load capacity. Namely, the high allowable rate of revolution of the bearings 12, 13, which constitutes the characteristics thereof, can be utilized effectively. The use of these angular contact ball bearings 12, 13 allows an increase in the rate of revolution of the output shafts 10, 11 and the horsepower to be transmitted.

In the above-described bevel gear transmission system, the power on the input shaft 2 is divided into two components. One component of the power is transmitted to the output shaft 10 through the engaging bevel gears 6, 16, while the other is transmitted to the output shaft 11 through the engaging bevel gears 7, 17. Accordingly, this bevel gear transmission system permits transmitting twice as large a power as a bevel gear transmission system employing a pair of bevel gears of the same dimensions. This shows that a bevel gear transmission system according to the present invention gives solves the problem encountered in a conventional system of this kind which is not capable of transmitting a large power since it does not have large bevel gears, which cannot be manufactured since a plant for this purpose is limited in scale.

Figure 2:
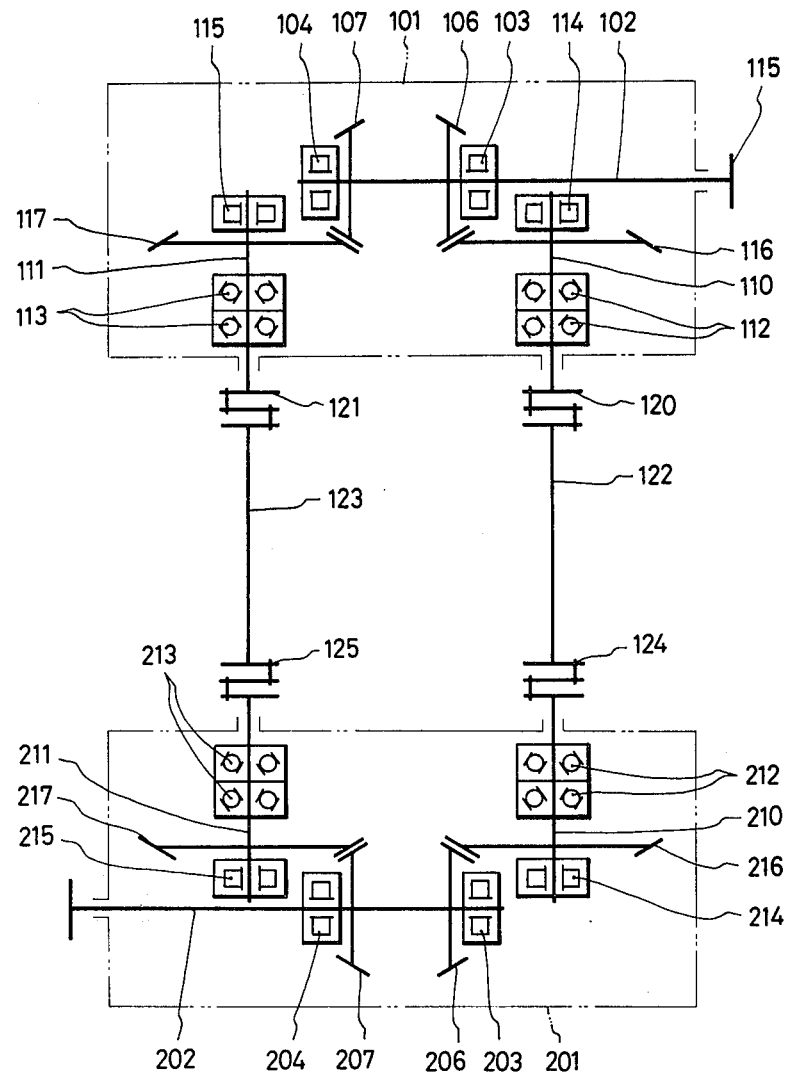
FIG. 2 is a schematic diagram of another embodiment of the present invention of a dual meshing type having one input shaft and one output shaft.

FIG. 2 is a schematic diagram of another embodiment of the present invention.

The construction of a bevel gear transmission housed in a gear box 101 in FIG. 2 is the same as that of the embodiment shown in FIG. 1.

Referring to FIG. 2, an input shaft 102 connected via a coupling 115 to a driving source (not shown) is supported on cylindrical roller bearings 103, 104, and a pair of bevel gears 106, 107 are fixedly mounted on one end portion of the input shaft 102. The directions in which the teeth of the bevel gears 106, 107 are spirally arranged are opposite to each other. These bevel gears 106, 107 face in opposite directions. Bevel gears 116, 117 are engaged with the bevel gears 106, 107, respectively, supported on angular contact ball bearings 112, 113 and cylindrical roller bearings 114, 115 and fixedly mounted on intermediate transmission shafts 110, 111. The intermediate transmission shafts 110, 111 are connected to subsequent intermediate transmission shafts 122, 123 via couplings 120, 121, and further to intermediate transmission shafts 210, 211 in a gear box 201 via couplings 124, 125. The intermediate transmission shafts 210, 211 are supported on angular contact ball bearings 212, 213 and cylindrical roller bearings 214, 215, and have bevel gears 216, 217 mounted thereon, respectively. The bevel gears 216, 217 are engaged with bevel gears 206, 207 which are fixedly mounted on an output shaft 202 supported on cylindrical roller bearings 203, 204. The bevel gears 216, 217 and bevel gears 206, 207 in a gear box 201 are engaged with each other in the same manner as the corresponding bevel gears in the gear box 101. The directions in which the teeth of the bevel gears 206, 207 are spirally arranged are opposite to each other, and these gears 206, 207 face in opposite directions. Therefore, substantially no axial thrust load is applied to the input shaft 102 and output shaft 202. Axial thrust loads applied to the intermediate transmission shafts 110, 111 and 210, 211 can be reduced to an extremely low level by setting the speed transmission ratio and a factor R in the same manner as in the embodiment shown in FIG. 1. Accordingly, a high horsepower can be transmitted at high speed from the input shaft 102 to the output shaft 202.

The bevel gear transmission system shown in FIG. 2 is advantageously used to transmit the power of an engine of a half-submerged ship to a propeller. This bevel gear transmission system used for the above purpose can be installed compactly and operated with an increased rate of revolution to increase the horsepower to be transmitted.

According to a bevel gear transmission system of the present invention described above, axial thrust loads applied to the input and output shafts can be completely eliminated or reduced to an extremely low level. Therefore, it permits employing as thrust bearings angular contact ball bearings which have a small load capacity but a large allowable rate of revolution, and increasing the horsepower to be transmitted by increasing the rate of revolution with the torque left unchanged. Consequently, a bevel gear transmission system according to the present invention can be advantageously used to transmit a high horsepower at high speed.

EXAMPLE

In the same transmission system allowable horsepowers to be transmitted of cylindrical roller bearings 3, 4 supporting an input shaft 2 in the same bevel gear transmission system as shown in FIG. 1, and allowable horsepowers to be transmitted of angular contact ball bearings 12, 13 supporting output shafts 10, 11, respectively, were calculated by setting the pressure angle $\alpha$ and helix angle $\beta$ of spiral bevel gears 6, 7, 16 and 17 to 20° and 35°, respectively, and by varying the pitch cone angle $\delta$ of the spiral bevel gears 16, 17 to vary the ratio of speed transmission to these shafts. The cone distance, module and tooth width of the bevel gears were set to 415 mm, 13 and 100 mm, respectively, on the assumption that the life of the bearings is 4 years or 12,000 hours.

Figure 3:
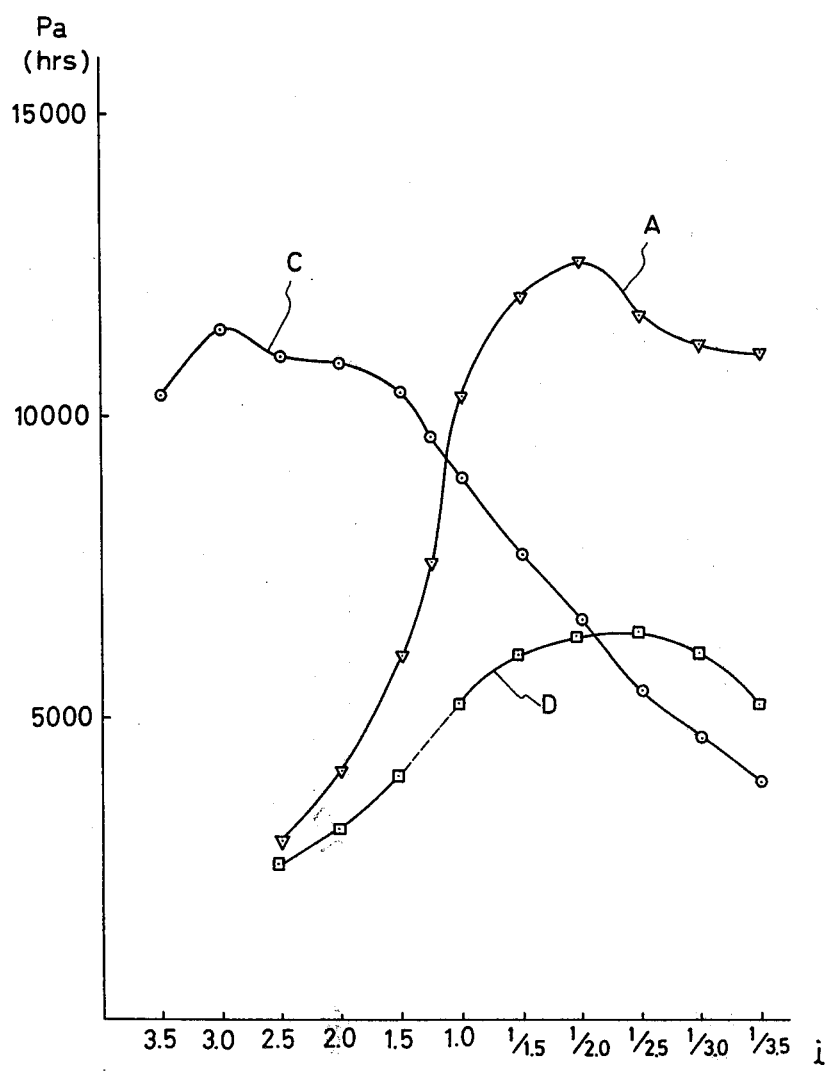
FIG. 3 is a graphical diagram showing the relation between the speed transmission ratio of a bevel gear transmission system according to the present invention and the horsepower which can be transmitted thereby.

FIG. 3 graphically shows the results of the above calculations. The abscissa in the graphical diagram represents a ratio i of speed transmission, and the ordinate an allowable horsepower Pa to be transmitted per one bearing. A curve A in FIG. 3 represents variations in allowable horsepower to be transmitted by the angular contact ball bearings 12, 13, and a curve C variations in allowable horsepower to be transmitted of the cylindrical roller bearings 3, 4.

As may be clearly understood from FIG. 3, the allowable horsepower to be transmitted of the angular contact ball bearings for the output shafts tends to increase with a decrease in the speed transmission ratio, while the allowable horsepower to be transmitted of the cylindrical roller bearings for the input shaft tends to decrease with a decrease in the speed transmission ratio. This indicates that, if the ratio of speed transmission is set to 1.45:1 to 0.476:1, a high allowable horsepower to be transmitted, which is satisfactory to both the angular contact ball bearings and the cylindrical roller bearings, can be obtained.

A curve D in FIG. 3 represents variations in allowable horsepower to be transmitted in which tapered roller bearings are used in place of the angular contact ball bearings 12, 13. As may be clearly understood from FIG. 3, the allowable horsepower to be transmitted of the angular contact ball bearings is higher than that of the tapered roller bearings in a range of 1.45:1 to 0.476:1 of the ratio of speed transmission.

The present invention is not, of course, limited to the above-described embodiments; it may be modified in various ways within the scope of the appended claims.

What is claimed is:

1. A high-speed bevel gear transmission system for transmitting a power between input and output shafts the axes of which intersect each other, which comprises an input shaft mounted on axially slidable bearings; a pair of driving bevel gears which are fixedly mounted on said input shaft such that said bevel gears face in opposite directions, teeth of the bevel gears being the same in number and size and spirally arranged in the opposite directions to each other; a pair of driven bevel gears engaged with said driving bevel gears, respectively; a pair of output shafts on which said driven bevel gears are fixedly mounted, respectively; and angular contact ball bearings for supporting said output shafts, the speed transmission ratio of the output shafts to the input shaft being between 1.45:1 to 0.476:1, the ratio R of a thrust load in the axial direction of said driven gears to a tangential load of said driven gears from a pressure angle $\alpha$ and a helix angle $\beta$ of said driving bevel gears and said driven bevel gears, and a pitch cone angle $\delta$ of said driven bevel gears being defined by the formula, $R=[(\tan\alpha\cdot\sin\delta)/\cos\beta]-\tan\beta\cdot\cos\delta$ being from $-0.324$ to 0.1.

2. A high-speed bevel gear transmission system according to claim 1, wherein each of said driving bevel gears and said driven bevel gears consists of a spiral bevel gear.

3. A high-speed bevel gear transmission system according to claim 1, wherein each of said driving bevel gears and said driven bevel gears consists of a skew bevel gear.

4. A high-speed bevel gear transmission system according to claim 1, wherein the axially slidable bearings supporting said input shaft are cylindrical roller bearings.

5. A high-speed bevel gear transmission system according to claim 1, wherein said transmission system consists of a reduction system wherein said speed transmission ratio is between 1:1 to 0.476:1.

6. A high-speed bevel gear transmission system according to claim 1, wherein said two output shafts are connected at the respective forward ends via a bevel gear transmission to an output shaft which intersects said first two output shafts.

7. A high-speed bevel gear transmission system according to any of claims 1-6, wherein a pressure angle $\alpha$ and a helix angle $\beta$ of teeth of said driving bevel gears and said driven bevel gears are 20° and 35°, respectively.

* * * * *

UNITED STATES PATENT AND TRADEMARK OFFICE
CERTIFICATE OF CORRECTION

PATENT NO. : 4,287,790
DATED : September 8, 1981
INVENTOR(S) : MINORU FUJIWARA ET AL It is certified that error appears in the above-identified patent and that said Letters Patent are hereby corrected as shown below: On The Title Page, In Item 57, the Abstract, at line 13, please delete "0.476:0.1" and insert therefor --0.476:1.0--

Signed and Sealed this

Second Day of February 1982

[SEAL]

Attest:

Attesting Officer

GERALD J. MOSSINGHOFF

Commissioner of Patents and Trademarks